United States Patent
Hafermalz et al.

(10) Patent No.: US 6,267,144 B1
(45) Date of Patent: Jul. 31, 2001

(54) ROTARY DISK VALVE FOR POWER STEERING SYSTEMS OF MOTOR VEHICLES

(75) Inventors: Jens-Uwe Hafermalz, Waldstetten; Peter Ertle, Durlangen; Karl-Heinz Urban, Spraitbach; Winfried De Maight, Mutlangen, all of (DE)

(73) Assignee: ZF Lenksysteme GmbH, Schwaebisch (DE)

( * ) Notice: Subject to any disclaimer, the term of this patent is extended or adjusted under 35 U.S.C. 154(b) by 0 days.

(21) Appl. No.: 09/623,606
(22) PCT Filed: Feb. 25, 1999
(86) PCT No.: PCT/EP99/01228
§ 371 Date: Nov. 16, 2000
§ 102(e) Date: Nov. 16, 2000
(87) PCT Pub. No.: WO99/44877
PCT Pub. Date: Sep. 10, 1999

(30) Foreign Application Priority Data

Mar. 3, 1998 (DE) .............................................. 198 08 796

(51) Int. Cl.$^7$ .................................................... B62D 5/083
(52) U.S. Cl. .............................. 137/625.21; 137/625.23; 91/375 A
(58) Field of Search .................. 137/625.21, 625.23; 91/375 R, 375 A

(56) References Cited

U.S. PATENT DOCUMENTS 5,738,182 * 4/1998 Birsching et al. ............. 91/375 A X
5,845,557 * 12/1998 Speidel et al. ....................... 91/375 A
6,009,903 * 1/2000 Rohringer et al. ............... 137/625.23
6,082,242 * 7/2000 Suzuki ................................ 91/375 A

FOREIGN PATENT DOCUMENTS

4232813 * 3/1994 (DE) ................................... 91/375 A
4300612 * 7/1994 (DE) ................................... 91/375 A

* cited by examiner

Primary Examiner—John Rivell
Assistant Examiner—Meredith H Schoenfeld
(74) Attorney, Agent, or Firm—Larson & Taylor PLC

(57) ABSTRACT

A rotary slide valve (1) for power steering in motor vehicles contains a rotary slide (2), which is non-rotatably connected to a valve inlet member (4). The control bushing (3) is non-rotatably connected to a valve outlet member (5).

The two valve elements are disposed so that they can move coaxially inside each other and can be maximally rotated in relation to each other over the rotational path of a lost motion coupling. The outside of the rotary slide (2) and the inside of the control bushing have control longitudinal grooves (6, 7), which cooperate with one another in order to direct a pressure fluid to and from two working areas of a servomotor The rotary slide (2) is connected to the valve outlet member (5) by means of a torsion bar spring (9). Manufacture conditional tolerances that can lead to undesirable effects in the driving behavior are compensated for by means of a play-free suspension connection (10).

6 Claims, 3 Drawing Sheets

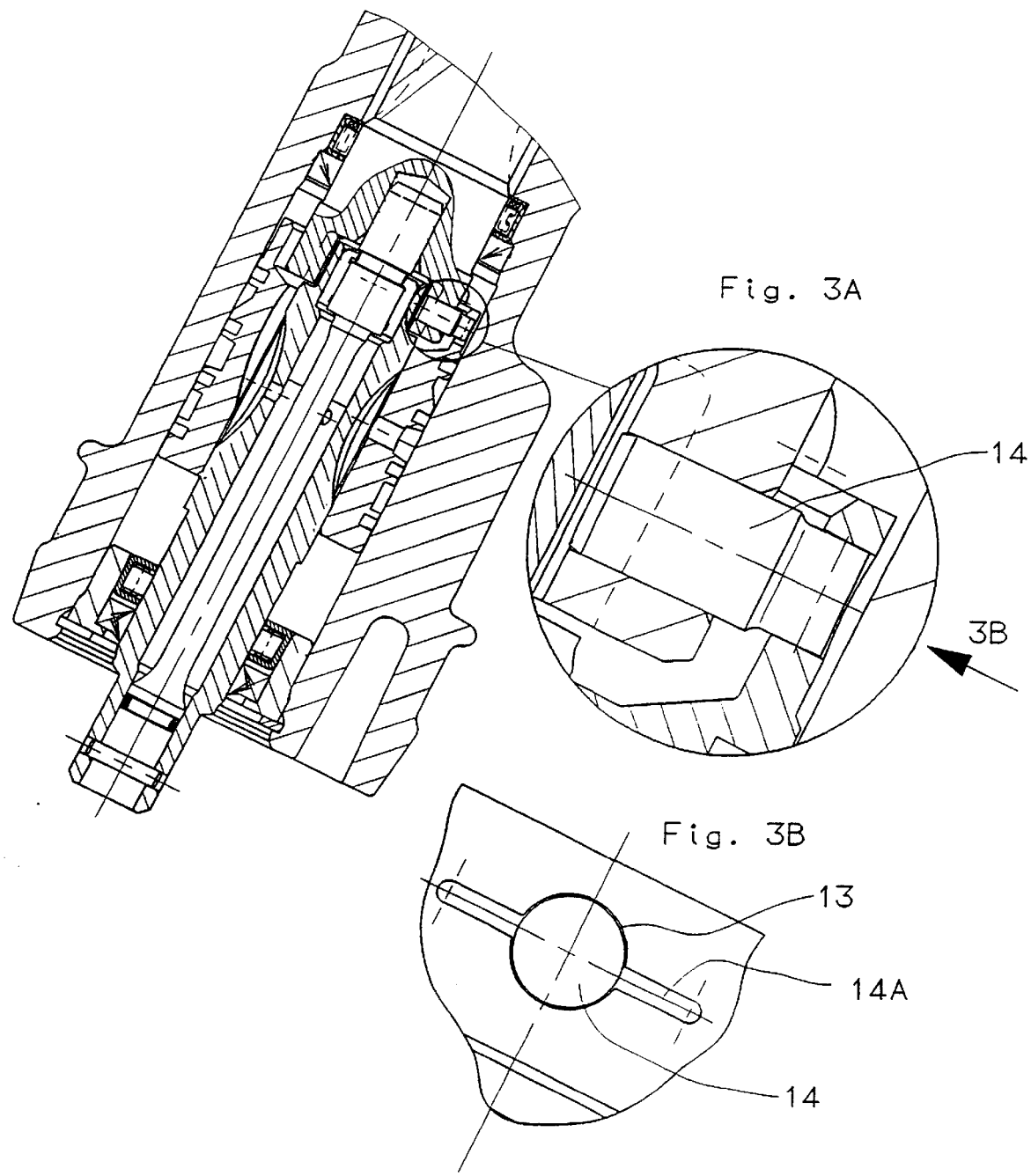

ROTARY DISK VALVE FOR POWER STEERING SYSTEMS OF MOTOR VEHICLES

The invention relates to a rotary slide valve for power steering in motor vehicles, according to the type defined in more detail in the preamble to claim 1.

The rotary slide valve contains two valve elements that are disposed so that they can move coaxially inside each other and, in order to execute a control path, are disposed so that they can rotate in relation to each other in a limited fashion.

The first valve element, which is connected to the valve inlet member, is embodied as a radially inner rotary slide. The second valve element is non-rotatably connected to the valve outlet member and is embodied as a radially outer control bushing. The rotary slide is also connected to a drive pinion via a lost motion coupling that defines the control path. A pin, which is press-fitted without play into the drive pinion, engages in the control bushing to produce a rotary drive connection.

Both valve elements have control longitudinal grooves which are at least partially limited in their axial span and are used to direct a pressure fluid to or from one of the two working areas of a servomotor. A torsion bar spring is used to restore the two valve elements from a deflected position back into their neutral position.

A rotary slide valve of this kind has been disclosed, for example, by U.S. Pat. No. 3,746,045. This rotary slide valve contains a rotary slide that is guided in an axial bore of a control bushing. The rotary slide is connected to a valve outlet member via a torsion bar and a lost motion coupling. This lost motion coupling limits the relative rotation of the two valve elements in relation to each other and constitutes a mechanical stop for the valve after the rotation path of the lost motion coupling has been exhausted. In the event of a failure of the hydraulic assistance, this mechanical stop must be able to transmit the entire mechanical steering force.

Another rotary slide valve has been disclosed by DE-41 08 597 A1. This rotary slide valve is distinguished by virtue of the fact that in order to reduce the wear on the pin that is press-fitted into the drive pinion, during assembly of the rotary slide valve, the center axis of the inner diameter of the control bushing intersects with the center axis of the pin hole, and the center axis of the inner diameter of the control bushing is shifted from the center axis of the valve assembly toward the side of the valve assembly, which is disposed opposite from the pin hole.

In the known rotary slide valve as well, during assembly, the control bushing is connected to the pin that is press-fitted into the drive pinion. In order make this assembly step possible, the connection of the control bushing and pin must have play.

As a result of the existing play between the control bushing and pin, a relative movement can occur between the rotary slide and the control bushing without a detectable steering moment being introduced by means of the steering wheel. This leads to undesirable oil flows to the working cylinder. In addition, the play in the steering wheel makes itself negatively perceptible by means of moment discontinuities. These steering moment discontinuities that occur are noticed as self-steering effects in the steering wheel and cause the driver to feel unsafe.

The object of the current invention is to produce a play-free rotary slide valve which can compensate for the negative effects of assembly-related tolerances on the steering behavior.

This object is attained by means of a rotary slide valve of this generic type which also has the characterizing features of the main claim.

The embodiment according to the invention can be realized in at least three structural variants. In a first structural variant, the play required for assembly is compensated for through the use of a split, radially resilient pin. The second constructive variant provides a split tubular bushing for tolerance compensation, and the third alternative produces the play-free connection by means of a split receiving bore in the control bushing.

Advantageous and suitable embodiments of the invention are disclosed in the dependent claims. However, the invention is not limited to the feature combinations of the claims; on the contrary, an expert will form other useful possible combinations of claims and individual claim features from the stated object.

Different exemplary embodiments of the current invention are described in principle below in conjunction with the drawings.

FIG. 1A is an enlarged depiction of the region of the drive connection with the split drive pin;

FIG. 1B is a top view of the region of the drive connection with the split drive pin shown in FIG. 1A;

FIG. 3 shows another exemplary embodiment of a rotary slide valve with a tolerance-compensating receiving bore in the control bushing;

FIG. 3A is an enlarged depiction of the region of the drive connection with a tolerance-compensating receiving bore in the control bushing, and FIG. 3B is a top view of the region of the drive connection with the tolerance-compensating receiving bore in the control bushing shown in FIG. 3A.

Figure 1:
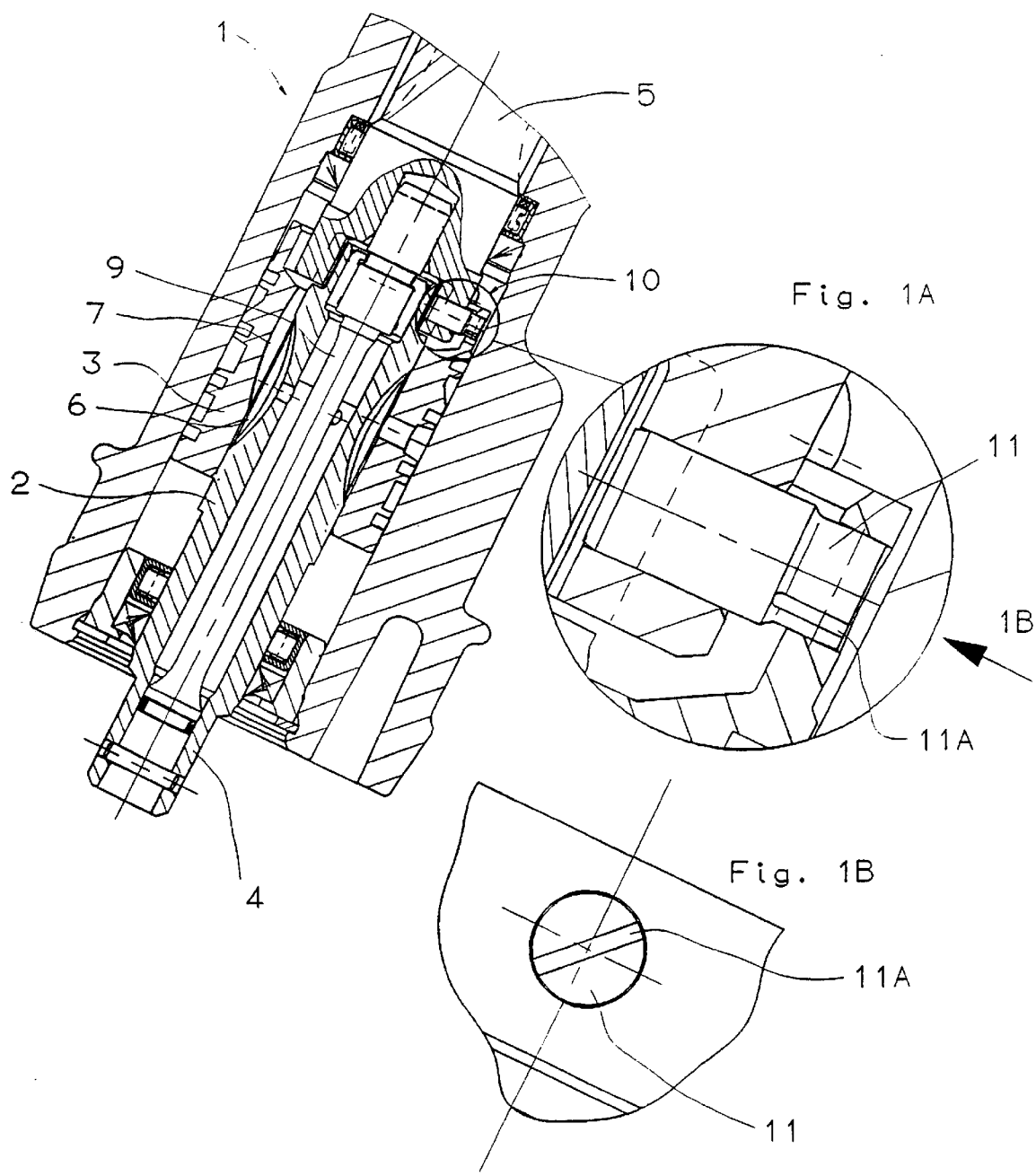
FIG. 1 shows a first exemplary embodiment of a rotary slide valve with a split drive pin.

The rotary slide valve 1 according to the invention has a first valve element in the form of a rotary slide 2 and a second valve element, which is embodied as a control bushing 3.

The rotary slide 2 is non-rotatably connected to a valve inlet member 4, which is embodied as a steering spindle connection. The steering spindle connection is connected, for example, to a steering spindle, not shown, which supports a steering wheel via a universal joint, also not shown. The rotary slide 2 is also connected to the valve outlet member 5 via a lost motion coupling, not shown.

The valve outlet member 5 can be embodied as a drive pinion or as a ball screw spindle, depending on whether rack or ball nut power steering mechanisms are used.

On the outer circumference surface of the rotary slide 2, there are control longitudinal grooves 6 which cooperate with the control longitudinal grooves 7 of the control bushing 3. Depending on its rotation direction, the rotary slide valve 1 produces a pressure fluid connection to a servomotor, not shown, via the control longitudinal grooves 6 and 7 and also via annular grooves 8 in the control bushing 3.

The valve inlet member 4 is also connected to the valve outlet member 5 via a torsion bar spring 9. The valve outlet member 5 is in turn non-rotatably connected to the control bushing 3 via a drive connection 10.

These different connections permit a limited rotation of the rotary slide 2 in relation to the control bushing 3. Through the rotation of the two valve elements in relation to each other, the pressure fluid supplied by a servo pump, not shown, is conveyed by means of a pressure fluid tank, likewise not shown, from the discharged working area of the servomotor into the charged working area.

The drive connection 10 between the control bushing 3 and the valve outlet member 5 is produced in FIG. 1 by means of a radially resilient drive pin 11, which is larger than the bore in the control bushing 3 and consequently, the clearance fit required for mounting the control bushing 3 changes to a play-free connection. The radially resilient drive pin 11 is deformed during assembly and consequently clamps the control bushing 3. The spring force produced in the drive region of the radially resilient drive pin 11 is greater than the forces acting on the control bushing 3 so that no relative movement can occur between the two valve parts. This embodiment of a drive connection 10 can be achieved by disposing a slit in a drive pin of a known rotary slide valve 1.

Figures 2, 2A, 2B:
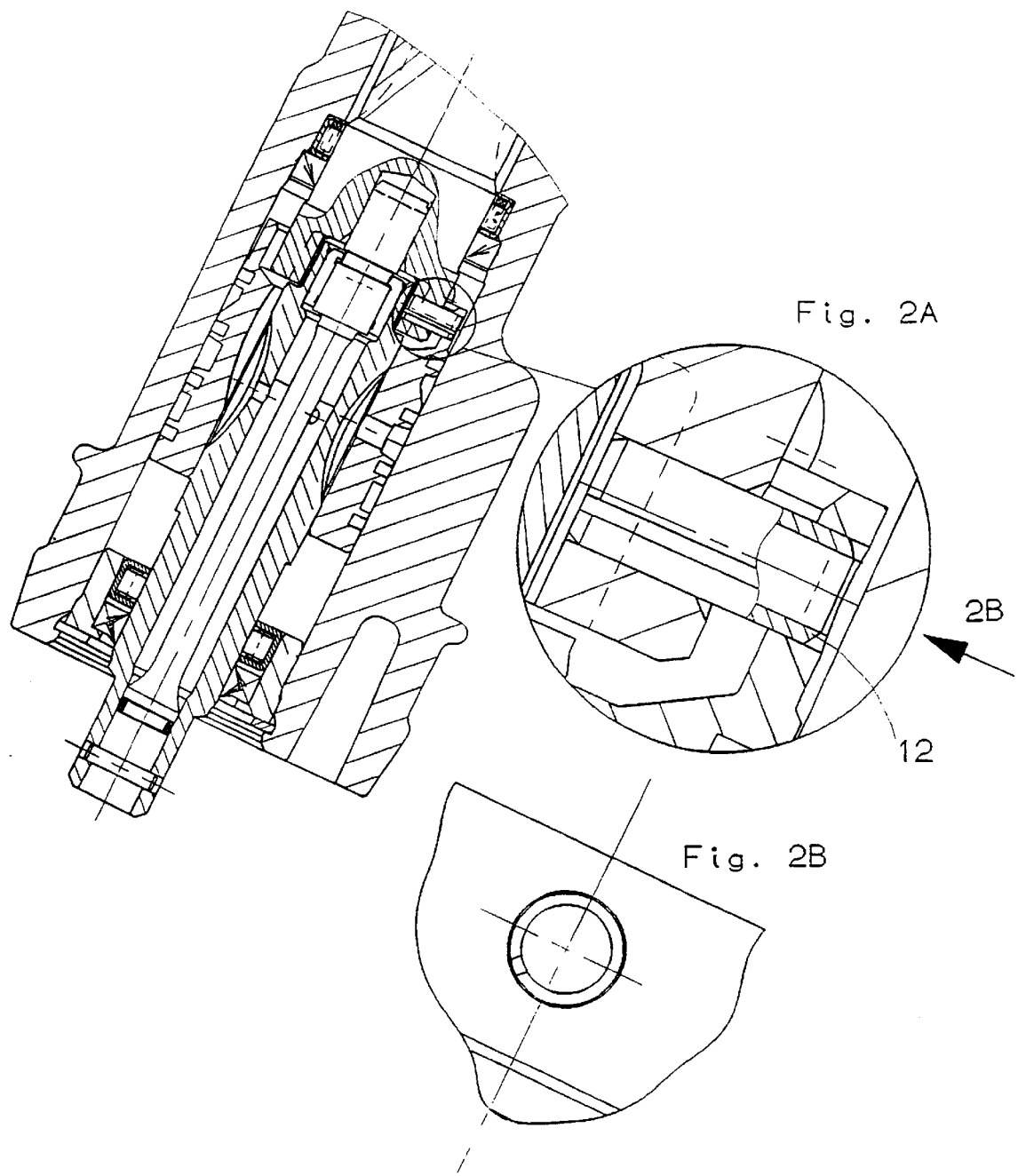
FIG. 2 shows a second exemplary embodiment of a rotary slide valve with a split tubular bushing as a connecting member between a drive pinion and a control bushing.
FIG. 2A is an enlarged depiction of the region of the drive connection with a split tubular bushing.
FIG. 2B is a top view of the region of the drive connection with the split tubular bushing shown in FIG. 2A.

By and large, the exemplary embodiments of FIGS. 2 and 3 correspond to the exemplary embodiment according FIG. 1. The only differences lie in the vicinity of the drive connection 10. In the exemplary embodiment according FIG. 2, the relative movement between the two valve parts is prevented by means of a drive connection 10 produced by means of a split tubular bushing 12.

In the embodiment with the split tubular bushing 12, the spring action can be used for the press-fitting into the valve outlet member 5 and into the drive bore of the control bushing 3.

The same effect is achieved by means of a tolerance-compensating receiving bore 13 in the control bushing 3. This permits a solid drive pin 14 of a known rotary slide valve 1 to be used.

The receiving bore 13 of the control bushing 3 is provided with at least one slit, which permits an elastic expansion during assembly.

In the exemplary embodiments described above, the rotary slide 2 is affixed to the valve inlet member 4 and the control bushing 3 is affixed to the valve outlet member 5.

However, there are also rotary slide valves that function with conversely associated valve elements. The invention can also be used for these rotary slide valves, with the same advantages.

REFERENCE NUMERALS

1 rotary slide valve
2 rotary slide
3 control bushing
4 valve inlet member
5 valve outlet member
6 control longitudinal grooves (rotary slide)
7 control longitudinal grooves (control bushing)
8 annular groups (control bushing)
9 torsion bar spring
10 drive connection
11 radially resilient drive pin
11A tolerance-compensating slit of the drive pin
12 split tubular bushing
13 tolerance-compensating receiving bore
13A tolerance-compensating slit in the control bushing
14 solid drive pin

What is claimed is:

1. A rotary slide valve (1) for power steering in motor vehicles, with a first valve element, which is non-rotatably connected to a valve inlet member (4), with a second valve element, which is non-rotatably connected to a valve outlet member (5), wherein the first valve element is connected to the valve outlet member (5) by means of a torsion bar spring (9) and by means of a lost motion coupling, the two valve elements are disposed in a valve housing coaxially inside one another and can be maximally rotated in relation to each other over the rotational path of the lost motion coupling, and the inside of the radially outer valve element and the outside of the radially inner valve element have control longitudinal grooves (6, 7), which are limited at least partially in their axial length and which cooperate with one another in order to direct a pressure fluid to and from two working areas of a servomotor, characterized and that the suspension connection (10) is embodied in a play-free manner by means of resilient elements.

2. The rotary slide valve according to claim 1, characterized and that the play-free suspension connection (10) is produced by means of a radially resilient suspension pin (11).

3. The rotary slide valve according to claim 2, characterized in that the radially resilient suspension pin (11) has at least one slit and a diametrical enlargement in the suspension region.

4. The rotary slide valve according to claim 1, characterized in that the lack of play of the suspension connection (10) is assured by means of a split tubular bushing (12).

5. The rotary slide valve according to claim 1, characterized in that the play compensation of the suspension connection (10) is produced by means of a tolerance-compensating receiving bore (13) in the control bushing (3).

6. The rotary slide valve according to claim 5, characterized in that the tolerance-compensating receiving bore (13) has at least one slit.

* * * * *